United States Patent [19]

Gabilondo

[11] Patent Number: 5,083,890
[45] Date of Patent: Jan. 28, 1992

[54] THREADED COUPLING OF TWO PARTS OF DIFFERENT HARDNESS

[75] Inventor: Francisco L. Gabilondo, Anzuola, Spain

[73] Assignee: Goizper, S. Coop., LTDA, Guipuzcoa, Spain

[21] Appl. No.: 667,821

[22] Filed: Mar. 12, 1991

[30] Foreign Application Priority Data

Mar. 12, 1990 [ES] Spain ..................................... 9000739

[51] Int. Cl.⁵ ........................ F16B 37/12; F16B 35/04
[52] U.S. Cl. ..................................... 411/438; 411/411
[58] Field of Search ............... 411/438, 386, 436, 900, 411/411, 249, 412, 242

[56] References Cited

FOREIGN PATENT DOCUMENTS

| | | | |
|---|---|---|---|
| 812487 | 8/1951 | Fed. Rep. of Germany | 411/411 |
| 896093 | 4/1944 | France | 411/411 |
| 2306363 | 10/1976 | France | 411/438 |
| 608233 | 9/1948 | United Kingdom | 411/438 |
| 684832 | 12/1952 | United Kingdom | 411/438 |
| 798373 | 7/1958 | United Kingdom | 411/438 |

Primary Examiner—Rodney M. Lindsey
Attorney, Agent, or Firm—Helfgott & Karas

[57] ABSTRACT

A threaded coupling includes a male part and a female part, of which one is made of a hard material such as metal and another of soft material such as plastic. The part made of the soft material is formed with a groove at a first turn of the screw thread thereof, which receives a metallic resilient ring to define a guide portion for the part of the hard material as the latter is being threaded to another part having the ring in the groove thereof.

7 Claims, 1 Drawing Sheet ns5,083,890

THREADED COUPLING OF TWO PARTS OF DIFFERENT HARDNESS

OBJECT OF THE INVENTION

The present invention relates to a series of improvements introduced in threaded couplings between parts of different hardness, specifically hard and soft parts, for instance a metallic part and a plastic part, which improvements are aimed at protecting the soft part so that its screw thread is not damaged by the hard part, when they are coupled together.

BACKGROUND TO THE INVENTION

It is a well-known fact that adapters made of a soft material, namely plastics, resins, etc., are frequently used to screw metallic parts to each other and vice versa. This is the case of adapters used for watering equipment, adapters used in fumigators or sprays for farming purposes, and so on.

These unions, when effected using identical or similar materials, for instance plastic nut and plastic bolt or metal nut and metal bolt, pose no problems and yet when materials of different hardness are used together, for instance when the nut is metallic (hard) and the screw plastic (soft), and particularly when the screw threads are rather thin, special care is required for the nut's screw thread to register with the bolt's screw thread, for the metallic element's screw thread could act as a diestock on the plastic element, along a slightly oblique axis as regards the original screw thread, causing the nut to be seized without same or the bolt being able to move forward, and the nut itself thus being ruined, for the original screw thread will have been partially or completely eliminated. This problem obviously arises both when the nut is hard and the bolt soft, and, alternatively, when the nut is soft and the bolt hard.

DESCRIPTION OF THE INVENTION

The improvements in threaded couplings between parts of different hardness subject hereof have been designed to fully solve the above problems.

More specifically, and in order to achieve the above, such improvements comprise replacing the first turn of the part made of soft material, whether the male part or the female part, i.e., the nut or the bolt, with a groove, for instance a bead-shaped groove, with a diameter equivalent to the thread pitch, such groove housing an open ring made of a hard material, of, for instance, circular section with an effective diameter equivalent to the pitch but with an original internal diameter smaller than the back end of the groove in the case of a male element, such as a bolt, or greater than the back end of the groove, in the case of a female element, such as a nut, in order that resilient stretching shall be required to assemble same in said soft element's groove, where such ring fits in snugly or is kept firmly in place upon springing back.

Obviously, and although a bead shape has been deemed preferable for the soft part's groove and a circular section for the ring, such elements can have a square, polygonal, diamond-shaped and other section at all events associated to each other, without this affecting the essence of the invention.

DESCRIPTION OF THE DRAWINGS

In order to provide a fuller description and contribute to the complete understanding of the characteristics of this invention, a single sheet of drawings is to the specification which, while purely illustrative and not fully comprehensive, shows the following.

PREFERRED EMBODIMENT OF THE INVENTION

In the light of these figures it is clear that the improvements subject hereof are applicable to parts due to be threadedly connected or coupled together, having, as aforesaid, a different grade of hardness, for instance a soft male part (1), as a bolt, and a hard part (2), as a nut.

Figure 1:
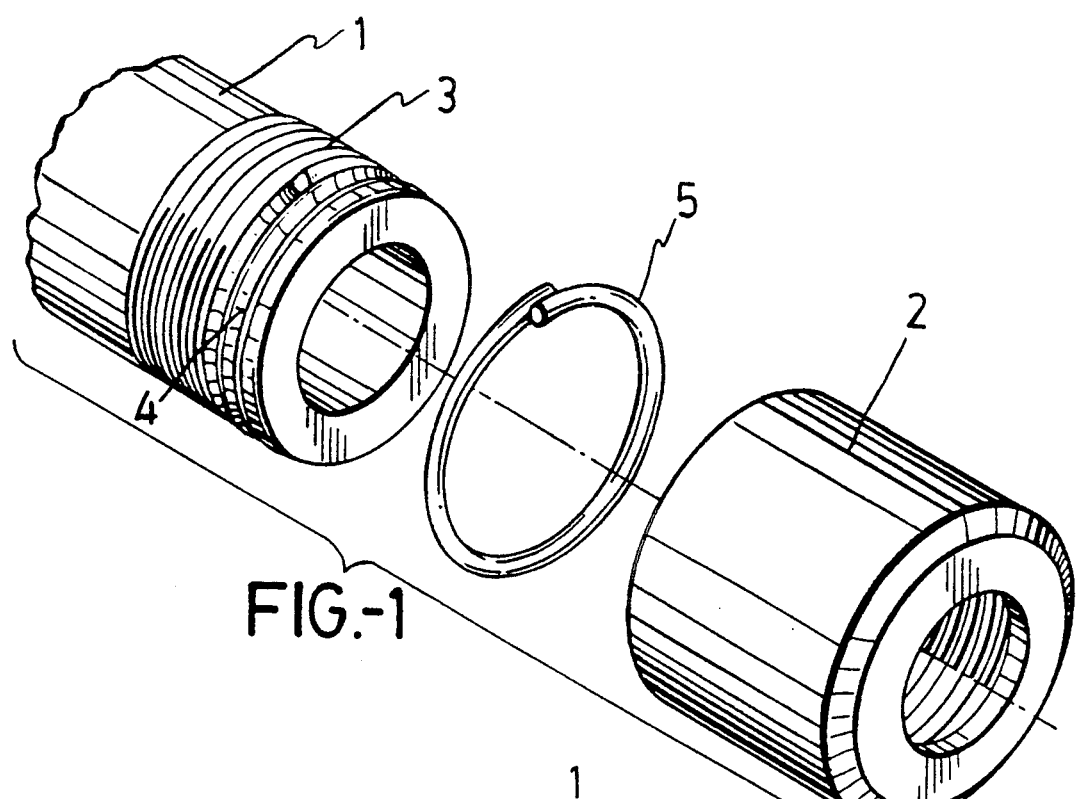
FIG. 1 is a perspective view of the constituent elements of two parts of differing hardness, designed to be threadedly coupled to each other, and provided with the improvements subject hereof, with the male part being the soft part.
Figure 3:
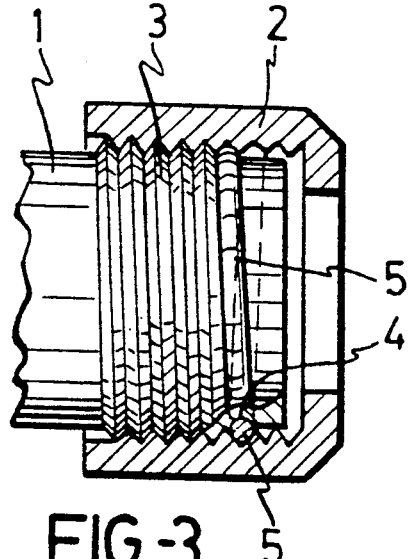
FIG. 3 is a partial cross-section of the duly coupled elements of FIG. 1.
Figure 2:
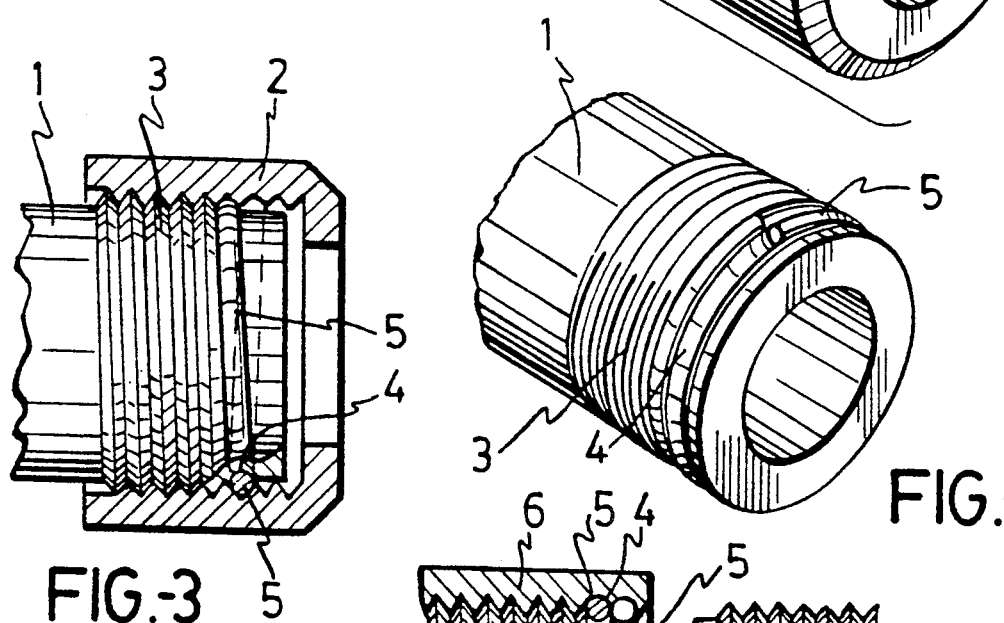
FIG. 2 is another perspective view of the metallic open ring duly attached to the said male part.

Now then, such improvements comprise providing the soft part, specifically the male part (1), at its screw thread (3) and more specifically at the terminal end thereof, with a groove (4) roughly on the first turn and designed for an open metallic ring (5) to fit in snugly, as shown in FIG. 2.

This ring (5) fits in snugly in the groove (4) in part (1) since its original diameter is rather smaller than that of the male part (1), and such ring must be resiliently stretched to be coupled in the groove (4), and therefore, upon release, when it springs back, such ring will fix and attach itself in place.

Thus, the ring (5) can act as a guide in the threaded coupling of parts (1) and (2), the hard part (2) meeting the soft part (1) though the ring (5), the metal/metal contact preventing the said soft part from being damaged.

Figure 4:
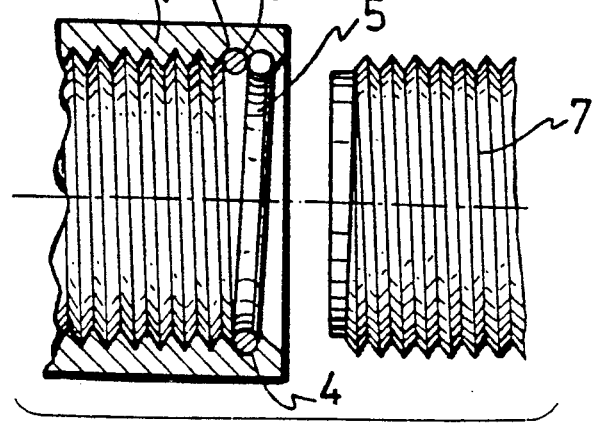
FIG. 4 is a side elevation view and diametrical section, respectively of two other parts that can be threadedly coupled, likewise provided with the improvements subject hereof, but where the female part is the soft part.

Alternatively, i.e., when the soft part is the female part, as in (6) in FIG. 4 and the hard or metallic part is the male part (7), the groove (4) is provided in the first turn of the female part (6), as a nut, and in this case the diameter of the ring (5) is oversized as regards the female part's (6) diameter, and it is therefore necessary to provide same with radial shrinkage to infix same within the nut, and therefore, upon springing back, it pushes firmly against the back end of the groove (4), as above.

Though in the preferred embodiment shown in the drawings, the groove (4) is bead-shaped and the open ring (5) has a circular section, such elements need only have a formal correspondence, and may be of square, polygonal, diamond-shaped or such other section as shall be deemed appropriate, without this affecting the essence of the invention, for the ring (5) will in any case define a "hard front", firmly attached to the soft part and protecting same when coupled to the hard part.

We feel that the device has now been described at sufficient length for any expert in the art to have grasped the full scope of the invention and the advantages it offers.

The materials, shape, size and layout of the elements may be altered provided that this entails no modification of the essential features of the invention.

The terms used to describe the invention herein should be taken to have a broad rather than a restrictive meaning.

I claim:

1. A threaded coupling of two parts each provided with a thread, comprising a male part and a female part made of materials having different hardness, one of said parts of softer material having an annular groove at a front end of a threaded portion thereof, said annular groove being of a depth corresponding to a width of at most two turns of the thread of said one of said parts; and an open ring completely enclosed within said annular groove and snugly fit therein, said ring being formed of metallic material harder than that of said one part to provide a guide on said one part of softer material for another part of harder material as said another part is being threadedly coupled to said one part so as to prevent said one part of softer material from being damaged during said coupling.

2. The coupling according to claim 1, wherein said one part is made of a material selected from plastic and resin.

3. The coupling according to claim 2, wherein said another part is of metal.

4. The coupling according to claim 1, wherein said one part of softer material is the male part, said metallic ring being resilient and having an outer diameter smaller than a thread pitch of said male part so that said ring is resiliently stretched to be coupled to said male part and becomes fixed in said groove as it springs back.

5. The coupling according to claim 1, wherein said one part of softer material is the female part, said metallic ring being resilient and having an outer diameter greater than a thread pitch of the female part so that said ring is resiliently compressed to be coupled to the female part and becomes fixed in said groove as it spring back.

6. The coupling according to claim 1, wherein said ring is circular in configuration.

7. The coupling according to claim 1, wherein said ring is polygonal in configuration.

* * * * *